United States Patent
Ibarz et al.

(10) Patent No.: US 8,538,106 B2
(45) Date of Patent: Sep. 17, 2013

(54) THREE-DIMENSIONAL ESOPHAGEAL RECONSTRUCTION

(75) Inventors: Julian Ibarz, Plainsboro, NJ (US); Norbert Strobel, Heroldsbach (DE); Liron Yatziv, Fremont, CA (US)

(73) Assignee: Siemens Aktiengesellschaft, Munich (DE)

( * ) Notice: Subject to any disclaimer, the term of this patent is extended or adjusted under 35 U.S.C. 154(b) by 344 days.

(21) Appl. No.: 12/902,412

(22) Filed: Oct. 12, 2010

(65) Prior Publication Data

US 2011/0091087 A1    Apr. 21, 2011

Related U.S. Application Data

(60) Provisional application No. 61/253,164, filed on Oct. 20, 2009.

(51) Int. Cl.
*G06K 9/00* (2006.01)

(52) U.S. Cl.
USPC ............................. 382/130; 382/132; 382/154

(58) Field of Classification Search
USPC ......................................... 382/130, 132, 154
See application file for complete search history.

(56) References Cited

U.S. PATENT DOCUMENTS

| | | | |
|---|---|---|---|
| 6,490,337 B1 * | 12/2002 | Nagaoka et al. | 378/20 |
| 7,035,371 B2 * | 4/2006 | Boese et al. | 378/41 |
| 7,113,631 B2 * | 9/2006 | Vaillant et al. | 382/154 |
| 7,305,062 B2 * | 12/2007 | Hambuchen et al. | 378/9 |
| 7,940,976 B2 * | 5/2011 | Ozawa | 382/132 |
| 2005/0232389 A1 * | 10/2005 | Klingenbeck-Regn | 378/9 |
| 2006/0078195 A1 * | 4/2006 | Vaillant et al. | 382/154 |
| 2007/0016108 A1 * | 1/2007 | Camus et al. | 600/587 |
| 2008/0194945 A1 * | 8/2008 | Kukuk et al. | 600/424 |
| 2009/0171321 A1 * | 7/2009 | Callaghan | 604/529 |

OTHER PUBLICATIONS

Chen SJ, Carroll JD "3-D reconstruction of coronary arterial tree to optimize angiographic visualization," IEEE Trans Med Imaging, Apr. 2000, 19(4):318-36.*

\* cited by examiner

*Primary Examiner* — Uptal Shah
(74) *Attorney, Agent, or Firm* — Donald B. Paschburg; F. Chau & Associates, LLC

(57) ABSTRACT

A method for three-dimensional esophageal reconstruction includes acquiring a first X-ray image from a first angle with respect to a subject using a first X-ray imager. At least a second X-ray image is acquired from a second angle, different than the first angle, with respect to the subject using a second X-ray imager. Additional X-ray images may be acquired from additional angle. A three-dimensional model of the esophagus is generated from the at least two X-ray images acquired at different angles. A set of fluoroscopic X-ray images is acquired using either the first X-ray imager or the second X-ray imager. The three-dimensional model of the esophagus is registered to the acquired set of fluoroscopic X-ray images. The three-dimensional model of the esophagus is displayed overlaying the set of fluoroscopic X-ray images.

20 Claims, 8 Drawing Sheets

THREE-DIMENSIONAL ESOPHAGEAL RECONSTRUCTION

CROSS-REFERENCE TO RELATED APPLICATION

The present application is based on provisional application Ser. No. 61/253,164, filed Oct. 20, 2010, the entire contents of which are herein incorporated by reference.

BACKGROUND OF THE INVENTION

1. Technical Field

The present disclosure relates to three-dimensional reconstruction and, more specifically, to three-dimensional reconstruction of the esophagus.

2. Discussion of Related Art

Cardiac dysrhythmia (arrhythmia) is characterized by abnormal electrical activity in the heart. Cardiac dysrhythmia may cause the heart to beat too fast, too slow, or irregularly. Cardiac dysrhythmia can be a life-threatening condition. Atrial fibrillation is a particularly common form of cardiac dysrhythmia. Here, the upper two chambers of the heart, known as atria, beat at irregular intervals. This irregular beating may be caused by abnormal electrical impulses that may be produced by diseased or damaged cardiac tissue. As chronic atrial fibrillation, and other forms of cardiac dysrhythmia may place patients at greater risk for certain conditions such as stroke, catheter ablation may be used to treat cardiac dysrhythmia such as atrial fibrillation.

In catheter ablation, catheters are inserted into a patient's blood vessels and then advanced towards the heart. When contact is made with cardiac tissue that is responsible for generating abnormal electrical impulses, the catheter is used to destroy the responsible tissue so that normal electrical impulse may be restored. Ablation of the responsible tissue is generally performed using heat. Pulmonary vein ablation (also called pulmonary vein antrum isolation or PVAI), is a common treatment for atrial fibrillation.

Due to the proximity of the left atrium and the esophagus, and owing to the fact that both the esophagus and the heart are in relative motion, heat generated during catheter ablation of the left atrium carries the risk of generating a left atrial-esophageal fistula. Such a complication is particularly serious and is associated with a high mortality rate. Reducing the ablation temperature and power settings along the posterior left atrial wall has been suggested to reduce the risk of this complication. Other approaches include esophageal temperature monitoring and the use of intracardiac echo. Identification of the esophagus' location and avoiding lesions directly overlaying the esophagus has been proposed as well. A particularly cost-efficient approach is to use orally administered barium paste to visualize the esophagus under X-ray during a case. While this is a simple and inexpensive technique, the difficulty with this approach is that the paste does not remain in the esophagus throughout the entire ablation procedure.

Accordingly, once the barium paste has cleared the esophagus, visualization of the esophagus by fluoroscope may be lost and the patient may be placed at a greater risk of atrio-esophageal fistula.

SUMMARY

A method for three-dimensional esophageal reconstruction includes acquiring a first X-ray image from a first angle with respect to a subject using a first X-ray imager. At least a second X-ray image is acquired from a second angle, different than the first angle, with respect to the subject using a second X-ray imager. Additional X-ray images may be acquired from additional angle. A three-dimensional model of the esophagus is generated from the at least two X-ray images acquired at different angles. A set of fluoroscopic X-ray images is acquired using either the first X-ray imager or the second X-ray imager. The three-dimensional model of the esophagus is registered to the acquired set of fluoroscopic X-ray images. The three-dimensional model of the esophagus is displayed overlaying the set of fluoroscopic X-ray images.

The subject may be orally administered a radiocontrast agent prior to the acquisition of the first X-ray image and the second X-ray image. The three-dimensional model of the esophagus may be generated from at least two images taken under different viewing angles of the radiocontrast as it coats the interior lining of the esophagus.

Generating the three-dimensional model of the esophagus from at least two X-ray images taken under different viewing angles may include finding at least two esophagus outline curves from each of the first and second X-ray images and reconstructing a three-imensional representation of the esophagus based on the at least four found esophagus outline curves. Generating the three-dimensional model of the esophagus from the at least two X-ray images taken under different viewing angles may further include generating a polygon surface mesh to express the reconstruction of the three-dimensional representation of the esophagus.

A user may manually identify the at least two esophagus outline curves from each of the first and second X-ray images.

Prior to displaying the three-dimensional model of the esophagus overlaying the set of fluoroscopic X-ray images, a user may be presented with an opportunity to confirm, correct or refine the generated three-dimensional model of the esophagus of the registration of the three-dimensional model of the esophagus to the set of fluoroscopic X-ray images.

The first X-ray imager may be mounted on a first C-arm and the second X-ray imager may be mounted on a second C-arm.

The acquired first X-ray image may be derived from a first fluoroscopic set of image frames and the acquired second X-ray image is derived from a second fluoroscopic set of image frames. The two fluoroscopic sets of image frames span a period of time in which the radiocontrast agent is orally administered to the subject.

Generating the three-dimensional model of the esophagus from at least two X-ray images taken under different viewing angles may include generating a preliminary model of the esophagus based on the detected radiocontrast and then enlarging the preliminary model of the esophagus by a safety margin to allow for esophageal wall thickness or esophageal motion. The esophageal wall thickness may be determined based on an image volume acquired from a CT scanner or MRI. The first fluoroscopic set of image frames may be combined to form the first X-ray image by combining maximum per-pixel values with respect to time and the second fluoroscopic set of image frames is combined to form the second X-ray image by combining maximum per-pixel values with respect to time. The first fluoroscopic set of image frames may be combined to form the first X-ray image by combining average per-pixel values with respect to time and the second fluoroscopic set of image frames is combined to form the second X-ray image by combining average per-pixel values with respect to time.

A device may be inserted into the esophagus of the subject prior to the acquisition of the first X-ray image and the second X-ray image and the three-dimensional model of the esophagus is generated from at least two X-ray images of the device inside the esophagus taken from different viewing angles. Generating the three-dimensional model of the esophagus from at least two X-ray images taken under different viewing angles may include finding a centerline of the esophagus in each of the X-ray images based on the location of the device inside of the esophagus, estimating a shape of the esophagus, and reconstructing a three-dimensional representation of the esophagus by drawing the estimated shape of the esophagus about the found centerline. A predetermined esophagus shape may be used as the estimate of the shape of the esophagus.

The shape of the esophagus may be estimated based on an image volume acquired from a CT scanner or MRI. The shape of the esophagus may be estimated by using Hermite curves to connect a plurality of points sampled from the first and second X-ray images.

A method for three-dimensional esophageal reconstruction includes orally administering a radiocontrast agent to a subject. A first X-ray image is acquired from a first angle with respect to a subject using a first X-ray imager. At least a second X-ray image is acquired from a second angle, different than the first angle, with respect to the subject using a second X-ray imager. At least two esophagus outline curves from each of the first and second X-ray images are found. A three-dimensional model of the esophagus is reconstructed based on the at least four found esophagus outline curves. A set of fluoroscopic X-ray images is acquired using either the first X-ray imager or the second X-ray imager. The three-dimensional model of the esophagus is registered to the acquired set of fluoroscopic X-ray images. The three-dimensional model of the esophagus is displayed overlaying the set of fluoroscopic X-ray images.

A method for three-dimensional esophageal reconstruction includes inserting a device into the esophagus of a patient. A first X-ray image is acquired from a first angle with respect to a subject using a first X-ray imager. A second X-ray image is acquired from a second angle, different than the first angle, with respect to the subject using a second X-ray imager. A 2D centerline of the esophagus is found within each of the first and second X-ray images based on the location of the device inside of the esophagus. A 3D centerline is reconstructed from both 2D centerlines and X-ray camera parameters. A shape of the esophagus is estimated. A three-dimensional model of the esophagus is reconstructed by drawing the estimated shape of the esophagus about the found centerline. A set of fluoroscopic X-ray images is acquired using either the first X-ray imager or the second X-ray imager. The three-dimensional model of the esophagus is registered to the acquired set of fluoroscopic X-ray images. The three-dimensional model of the esophagus is displayed overlaying the set of fluoroscopic X-ray images.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
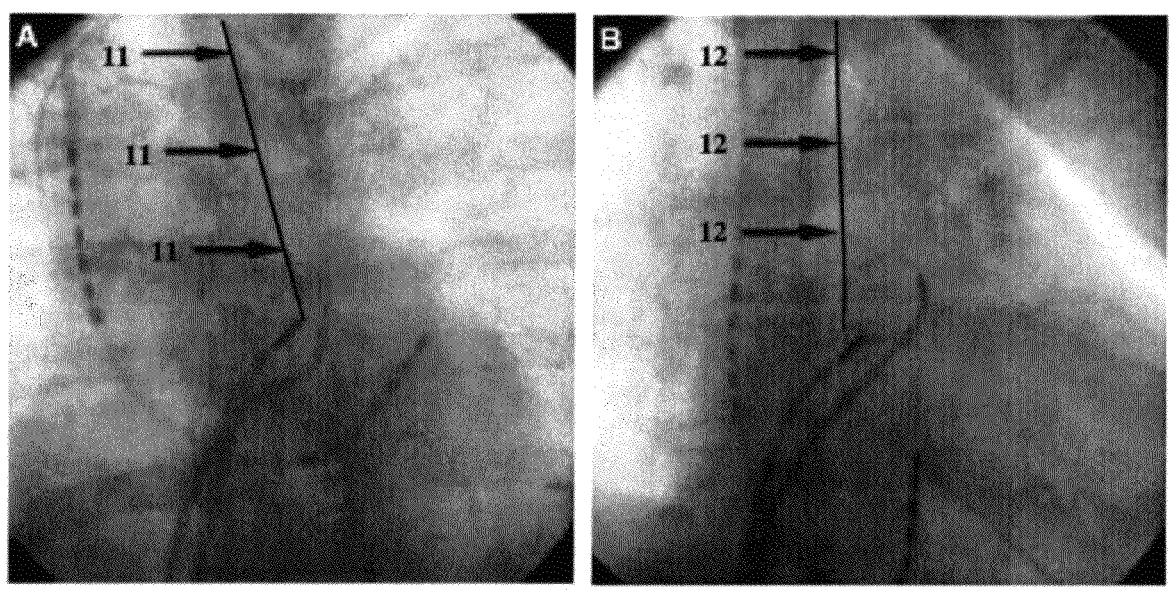
FIG. 1 is an example of fluoroscopic images illustrating esophageal temperature probes within the esophagi of two different patients.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to reduce the risk of complications such as atrio-esophageal fistula while undergoing electrophysiological intervention such as catheter ablation. This may be performed by providing three-dimensional esophageal imagery in a manner that is enduring, even after radiocontrast has cleared. By utilizing an accurate three-dimensional image of the esophagus, electrophysiologists and other healthcare practitioners may be able to know, in advance, when intervention threatens a burning of the esophagus.

The three-dimensional esophageal model may be generated, according to exemplary embodiments of the present invention, by acquiring at least two X-ray images taken from different directions. This may be accomplished, for example, by the use of two distinct X-ray imagers mounted on one or more C-arms or with the use of a single bi-plane X-ray imager. When so mounted, an X-ray source is placed on one end of the C-arm and a detection panel is placed on the opposite end of the C-arm, the C-arm may then be rotated with the patient remaining between the source and detection panel so that the patient may be imaged from the desired angle. The imagers may be fluoroscopic and may be capable of acquiring a series of X-ray image frames that may be observed in succession to produce a moving image.

The X-ray detection panels may be connected to an image processing device where the X-ray detection panel output is interpreted as an image. The images so acquired may then be stored for later retrieval or subsequent processing may be performed in real-time. Subsequent image processing may be performed using the same image processing device or a different image processing device. The image processing device (s) may include a general-purpose computer system and/or may include specialized image processing hardware. In either case, the image processing system may include a graphics processing unit (GPU).

The image processing device may include a display device for displaying the processed imagery, for example, in real-timer, and/or may be able to store processed imagery to a database for later retrieval. The database may be a specific medical image database or may be a more general electronic patient records database.

An exemplary workflow may include a patient swallowing a radiopaque contrast agent such as a barium paste. Alternatively, a device that is observable by X-ray imagery may be inserted into the esophagus. Examples of suitable devices may include a temperature probe or a feeding tube. Both X-ray imagers may then be activated to acquire two-plane imagery. The image processing device may then combine the X-ray panel information from both panes and may use a priori knowledge of the relative angles of both X-ray imagers to compute a three-dimensional model of the esophagus.

This phase of establishing the 3D model of the esophagus may only require the acquisition of a single image frame from each X-ray imager and in this way X-ray exposure may be limited. Once a 3D representation has been computed, one of the X-ray imagers may be used to acquire a fluoroscopic set of images for display in real-time. The other X-ray imager may remain inactive during this phase to further limit X-ray exposure.

Using various techniques for fluoroscopic overlay, the 3D model of the esophagus may be registered to and combined with the continuing fluoroscopic set of images acquired from the active X-ray imager. Thus, a real-time display may be provided showing the fluoroscopic set of images combined with the registered 3D model of the esophagus. The 3D model of the esophagus may thus endure even after the barium paste has cleared the esophagus and this combined imagery may be used by an electrophysiologist to perform catheter ablation while monitoring the proximity between the ablation cite and the esophagus to ensure that atrio-esophageal fistula does not occur. In addition to providing the electrophysiologist with the combined view, exemplary embodiments of the present invention may also automatically monitor proximity between the 3D model of the esophagus and the ablation cite and accordingly, a warning may be generated when a predetermined measure of proximity occurs for longer than a defined period of time.

As described above, the combined view may be used to provide guidance during the performance of electrophysiology interventions. Other graphical objects may also be superimposed over the fluoroscopic frames. These other objects may represent, for example, additional parts of the heart, ablation points, further human anatomy, and any other devices involved.

The 3D model of the esophagus need not be limited to an actual location of the esophagus at an instant in time. For example, the phase in which both imagers are simultaneously active and collecting data may be extended over a length of time so that the full range of esophagus motion may be imaged. Then, the 3D model of the esophagus may be enlarged to show the full range of esophagus motion so that when the 3D model is combined with the fluoroscopic view, the electrophysiologist may be able to identify every location in which the esophagus may be. Alternatively, or additionally, the 3D model of the esophagus may be enlarged by a predetermined margin to provide for added safety and to account for esophagus motion and patient motion. As the esophagus itself has a certain thickness that may not be observable by the barium paste which only lines the internal surface of the esophagus, the safety margin added to the 3D model may account for the esophagus wall thickness as well.

The 3D model of the esophagus need not be generated using detected radiocontrast media such as barium paste. Other objects that are viewable on an X-ray image may be used in detect the esophagus. For example, where a temperature probe is inserted into the esophagus, the temperature probe may be seen within the X-ray and the probe may be used to generate the 3D model of the esophagus. For example, the X-ray imagers may record the temperature probe being inserted and/or pulled back from the esophagus so that the bounds of the esophagus may be estimated from the location of the temperature probe at various locations within the esophagus. Alternatively, the cables of the temperature probe that run down the esophagus to the probe may be used as an estimation of the esophagus centerline. Once a centerline is known, the 3D model of the esophagus may be built by estimating the thickness of the esophagus and constructing a cylinder around the centerline. The estimated esophagus thickness may be automatically determined or may be manually provided. Alternatively, a feeding tube may be used to calculate the esophagus centerline.

Since exemplary embodiments of the present invention may utilize two approaches for generating the 3D esophagus model: one approach using direct contrast administration, the other approach based on a centerline, the 3D esophagus reconstruction may be based on an approach that calculates a 3D centerline from two 2D centerlines first. Then, the width of the esophagus may be set. For a start, a cylinder with a fixed diameter may be drawn around a centerline. Then, control points along the cylinder surface could be offered with which to adjust the cylinder's shape to the outlines shown in the X-ray images. As an alternative, one could extract the dimensions of the esophagus from a pre-procedural CT image. More sophisticated approaches may be used as well. Such approaches may account for changes in relative positions of the esophagus and atria.

FIG. 1 is an example of fluoroscopic images illustrating esophageal temperature probes (highlighted) within the esophagi of two different patients. The temperature probe in the first image (A) is demarked with arrows 11 and the temperature probe in the second image (B) is demarked with arrows 12. These images demonstrate variability of esophageal course posterior to left PVs (A) and mid-posterior wall (B). Because of this observed variability, clearly identifying the location of the esophagus can be helpful in minimizing the risk of atrio-esophageal fistula during the performance of catheter ablation.

Figure 2:
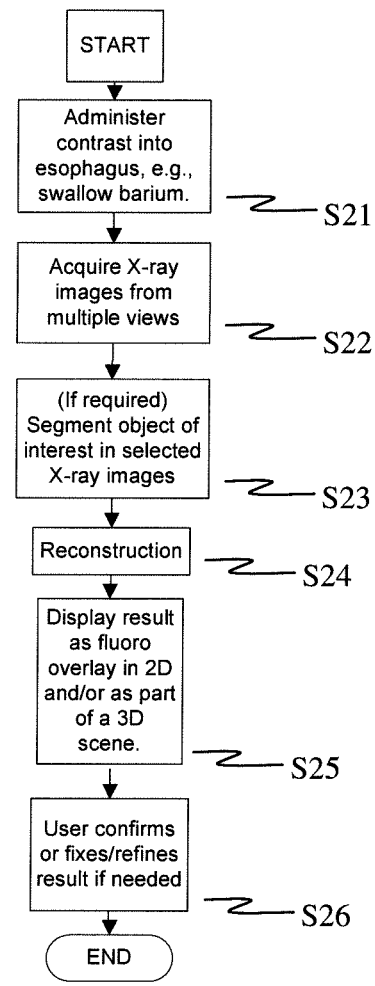
FIG. 2 is a flow chart illustrating an approach for three-dimensional esophageal reconstruction utilizing a radiocontrast agent according to an exemplary embodiment of the present invention.
Figure 3:
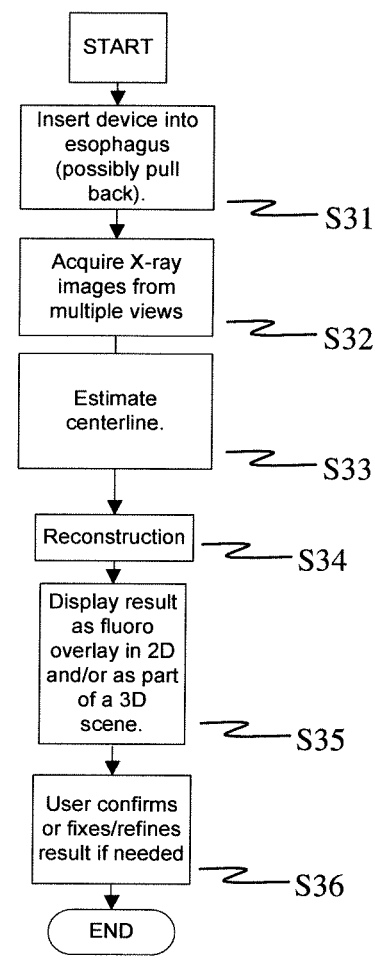
FIG. 3 is a flow chart illustrating an approach for three-dimensional esophageal reconstruction utilizing an esophageal centerline according to an exemplary embodiment of the present invention.

Exemplary embodiments of the present invention may utilize one of a number of clinical workflows to obtain the desired display. While several examples of such workflows are described herein, it is to be understood that other workflows may be used to practice exemplary embodiments of the present invention. FIGS. 2 and 3 are flow charts illustrating example workflows for generating a hybrid view of a 3D model of the esophagus registered to and superimposed over a 2D fluoroscope X-ray image sequence according to exemplary embodiments of the present invention.

Figure 5:
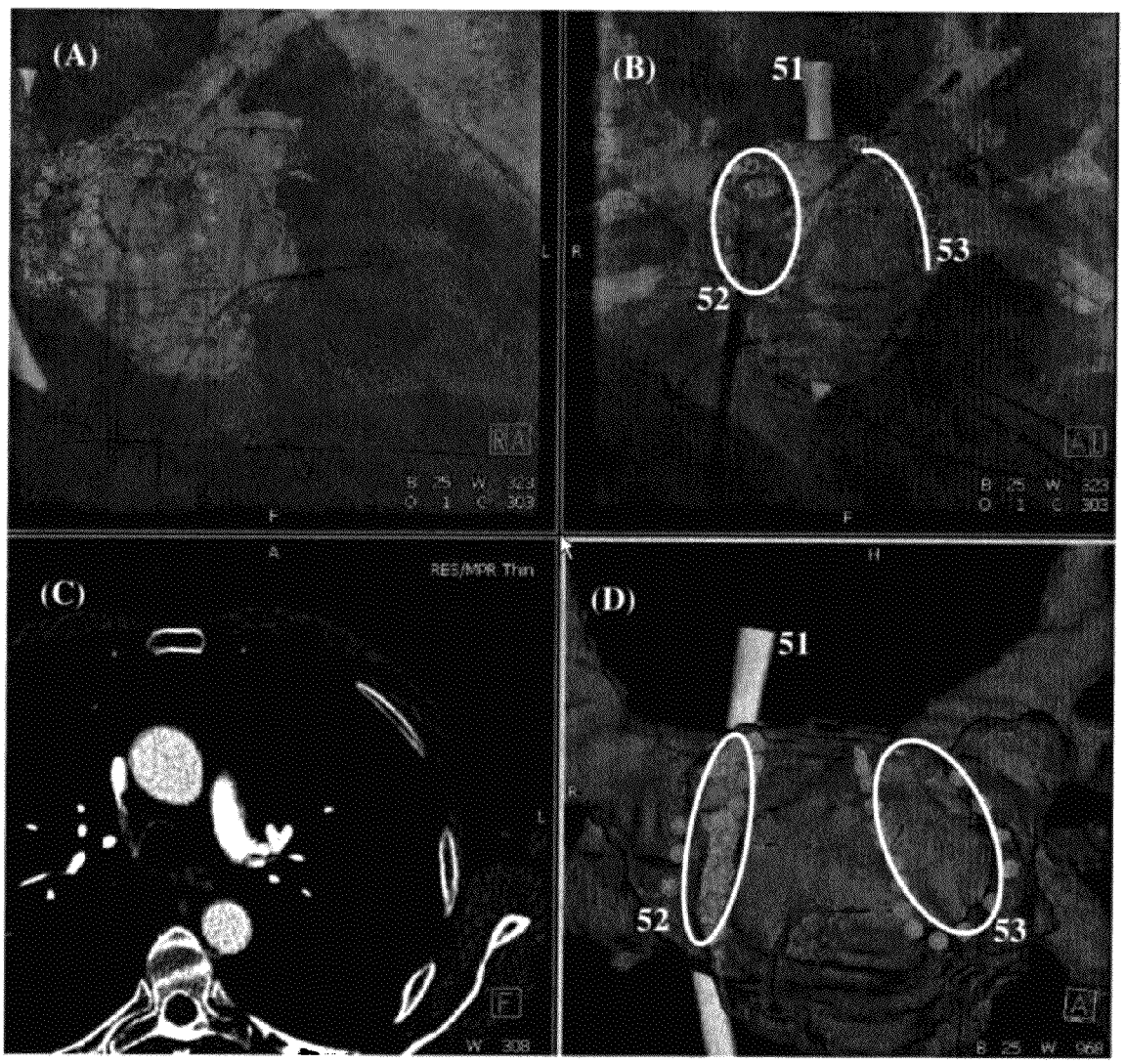
FIG. 5 is a set of images illustrating three-dimensional esophagus reconstruction according to an exemplary embodiment of the present invention along with an exemplary CT slice image verifying the accuracy of the width of the three-dimensional esophagus reconstruction.

In the workflow of FIG. 2, an exemplary approach is depicted that involves direct contrast administration into the esophagus, for example, by having the patient swallow barium. A related exemplary result is depicted in FIG. 5. In the workflow of FIG. 3, a device inserted into the esophagus is used to identify the esophageal location. The device may be any implement that would show up to some extent on an X-ray image and could be, for example, a temperature probe, a feeding tube, a transesophageal echo (ultrasound) probe, etc. In either case, a 3D representation of the esophagus may be calculated as explained below.

According to the workflow that includes direct contrast administration as depicted in FIG. 2, first a radiocontrast agent such as a barium paste is swallowed by the patient (Step S21). Next, X-ray imagery may be acquired from multiple views (Step S22). As described above, the X-ray imagery may be acquired using two distinct X-ray sources and detectors that are mounted on C-arms. The acquired X-ray imagery may be either a single X-ray image frame or a sequence of frames acquired over a length of time.

Segmentation of an object of interest may then be performed within each of the acquired X-ray images (Step S23). The segmented object of interest may serve as a point of reference that may be used in merging the two 2D X-ray images into a single 3D model. The object of interest may be, for example, the esophagus itself. Segmentation may be automatic, manual or a combination of these approaches that allows for a user to assist in otherwise automated segmentation. Alternatively, or additionally, another object appearing in the X-ray images may be automatically segmented and then used to help in reconstruction. Examples of other objects may include the ribcage or spine. Segmentation may not be needed in certain instances, an in such instances this step may be omitted.

Figure 6:
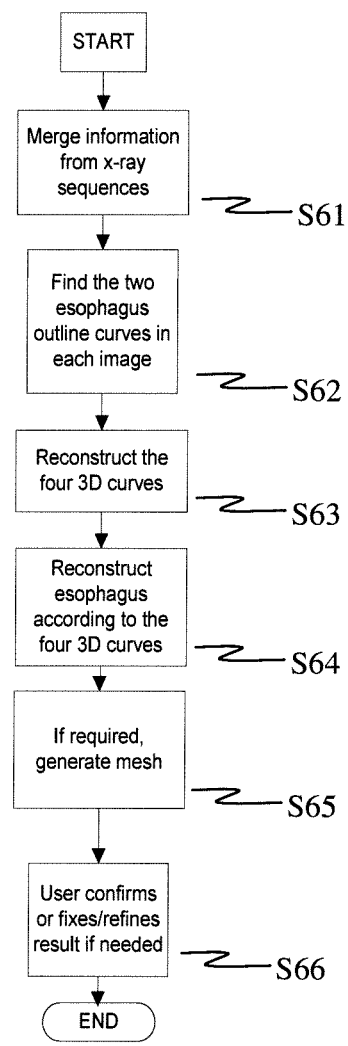
FIG. 6 is a flow chart showing workflow details pertaining to a method for performing contrast-based esophagus reconstruction according to an exemplary embodiment of the present invention.

Next, the two acquired X-ray images may be used to reconstruct a 3D esophagus model (Step S24). FIG. 6 is a flow chart showing a method for performing contrast-based esophagus reconstruction according to an exemplary embodiment of the present invention. Reconstruction may include first merging information from the two x-ray sequences (Step S61). Next, two esophagus outline curves may be found in each of the two 2D x-ray images (Step S62). The four found 2D outlines may then be reconstructed into four 3D curves (Step S63). The esophagus may then be reconstructed based on the four 3D curves (Step S64). Reconstruction may include generation of a polygon surface mesh from the reconstructed esophagus (Step S65). User input may be used to accept the accuracy of the model and at this step the user may be provided with an opportunity to fix or refine the results if need be (Steps S66).

When the contrast agent is swallowed by the patient, it may flow down the esophagus. A single X-ray image from each direction might not capture enough of the esophagus because it represents a snapshot in time when the contrast agent may only coat a particular portion of the interior of the esophagus. In such a case a sequence of X-ray images may be used to collect esophagus information over time. This step of the invention may be employed when a single X-ray image is not enough to show the entire esophagus. An operation may be used to combine multiple X-ray frames into a single 2D image of the whole esophagus. This operation on the image sequence takes into account that the contrast agent is darker than any of the anatomy of the patient. The operation may include first determining, for each pixel of each of the image sets, a maximum pixel intensity and/or a minimum pixel intensity. Then a maximum intensity and/or minimum intensity image may be generated. Next, an average pixel intensity may be calculated for each pixel over the series of frames. Image processing techniques may then be used to detect regions of high contrast for each image frame. The detected regions of high contrast may then be combined across all image frames to generate the outline of the esophagus. The per pixel maximum and/or minimum image and the average pixel intensity over time may be used to compensate for motion such as breathing motion. Combination of the detected regions may rely upon heuristics to determine an accurate esophagus outline.

The merging of information from X-ray sequences (Step S24a) may yield a single image for each view direction of the X-ray device. At least two view directions are needed to calculate a 3D representation of the esophagus. The views could be obtained sequentially by rotating the device. In this case, the patient may be instructed to hold breath during image acquisition to minimize motion between image acquisition steps. If a bi-plane device is available, images from two view directions can be obtained simultaneously thereby avoiding the need to hold breath.

The merging step may provide an entire shadow of the esophagus projection, or a part thereof, on two images and in two directions. In finding the two esophagus outline curves in each image (Step S24b), the esophagus may be segmented in each image resulting in two outlines along the left and the right border of the esophagus for each image.

This process may be done manually based entirely on user interaction, semi-automatically, or fully automatically. Fully manual can be done by having the user mark the two lines in each image. A semi-automatic method may involve some guidance by the user, for example: (1) A smart scissors algorithms may be used when the users supplies dots which are connected by following the edge (rapid change in intensity in the image). (2) The user may supply a point in the top part of the esophagus and bottom part and a matching contour would be selected automatically. (3) One dot in the center of the esophagus may be provided by the user to guide an automatic method. (4) A scribble-based segmentation method may be used. (5) A trained algorithm such as AdaBoost may be used. (6) An automated algorithm based on background subtraction may be used. (7) An automated algorithm based on 2D model of esophagus projection may be used.

In each case, Step 24b results with the finding of two 2D curves for each image representing the outline (sides) of the esophagus projection. In total the results is four 2D curves. Note, however, that the esophagus is a very critical structure. Care may be take when using reconstruction methods. To ensure accuracy, the user may be asked to confirm that the result of the 3D esophagus reconstruction is indeed correct.

In reconstructing the four 3D curves (Step S24c), the four 2D curves (two per X-ray image) found by the previous step may be used to compute four 3D curves. This may be done by using the known projection geometry between the two X-ray sources and detector. The computation may be done using known computer vision techniques. This could be an accurate 3D curve reconstruction (pixel-by-pixel) or estimated curve by triangulating sample points and mid points are interpolated (e.g. Hermit curve).

In reconstructing the esophagus (Step S24d), the four curves computed in the previous step may be used to reconstruct the surface of the esophagus. Depending on the application requirements the reconstruction can be: (1) based on a model either generic or specific that is matched to the 3D curves, (2) based on prior knowledge for of the patient (for example, if a CT of the patient is available, the esophagus surface can be extracted and matched to the 3D curves), (3) based on heuristics or an estimate (for example, assuming the esophagus is an elliptic shape. The surface of the esophagus may be constructed out of ellipses that best inscribe the geometric shape created by linearly connecting any two adjusted 3D curves.

Once a 3D representation of the esophagus has been computed, safety margins may be added. Safety margins may be used, for example, to account for the wall thickness of the esophagus or for its motion. The esophagus' walls are not contrasted by direct administration of contrast into esophagus. Hence, they may invisible under fluoroscopy.

An example of the heuristic approach is described below. The purpose of the heuristic approach is to estimate the esophagus' surface as a Hermite curve connecting the geometric shapes created by linearly connecting any two adjusted 3D curves. Initially, the direction that best describes the esophagus direction may be found. This may be based on the four curves from the previous step. In this example the direction is referred to as the z direction.

Figure 4:
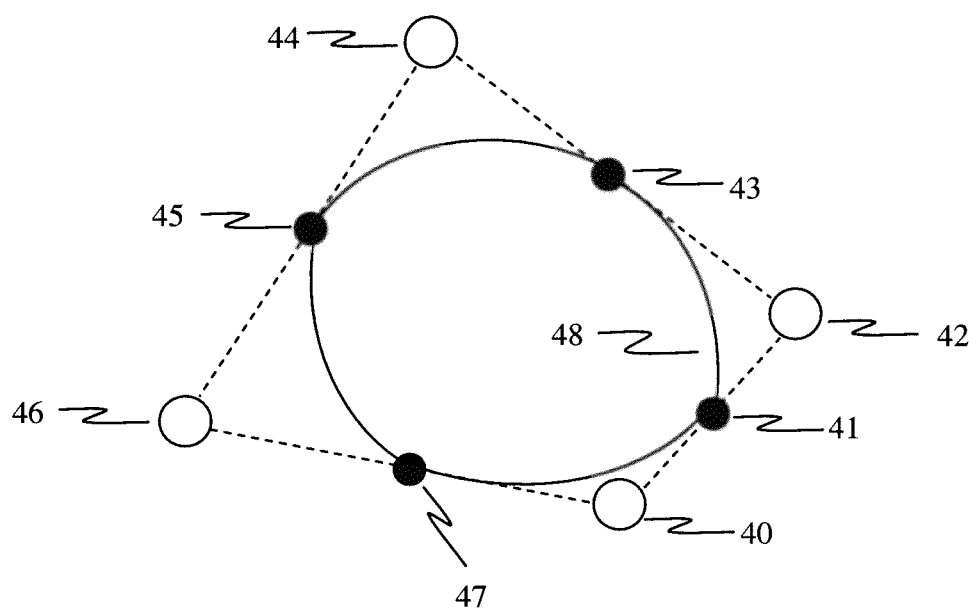
FIG. 4 is a diagram illustrating a heuristic approach to esophageal surface estimation according to an exemplary embodiment of the present invention.

The four curves may be sampled along the z direction such that the four 3D curves may be represented by points within common planes. In this way, the esophagus can be viewed as slices on particular planes. FIG. 4 is a diagram illustrating a heuristic approach to esophageal surface estimation according to an exemplary embodiment of the present invention. Points 40, 42, 44, and 46 represent the points of the four curves that lie on the common plane. The middle (average point) between each set of adjacent points are labeled 41, 43, 45, and 47. These middle points are then connected using a Hermite curve. The result for each z value is a 2D curve. The 2D curves may be discretized and using basic meshing techniques, a mesh can be created. A related exemplary result is depicted in FIG. 5, described in detail below.

FIG. 5 is a set of images illustrating three-dimensional esophagus reconstruction according to an exemplary embodiment of the present invention along with an exemplary CT slice image verifying the accuracy of the width of the three-dimensional esophagus reconstruction. Image (A) and (B) show the 3D esophagus model 51 overlayed with live 2D fluoroscope images in two different directions. Image (D) illustrates a 3D graphical scene with a free camera so the physician can better measure the distance of the planned ablation points to the esophagus. Image (C) is an axial CT slice. Such slices may be scrolled through, for example, to verify the width of the reconstructed esophagus. In images (B) and (D), planned ablation lines 52 and 53 are shown.

Where a radiocontrast such as a barium paste is not used, the 3D model reconstruction of the esophagus may be derived from an esophagus centerline, as seen using a temperature probe or some other device. FIG. 3 is a flow chart illustrating a workflow for providing a 3D esophagus reconstruction that is based on an observation of an esophageal centerline according to an exemplary embodiment of the present invention.

First the devise, for example, a temperature probe, is inserted into the esophagus (Step S31). X-ray images are acquired simultaneously from at least two imaging devices positioned at to different angles with respect to the patient (Step S32). The imaging devices may be mounted, for example, on C-arms. The acquired X-ray images may each include a set of image frames to capture motion. The images may be acquired while the temperature probe is inserted. Additionally or alternatively, the images may be acquired while the temperature probe is pulled back.

From each of the multiple X-ray images taken from different angles, an esophagus centerline may be estimated either based on the location of the wire that runs down the esophagus to the temperature probe, or by the position of the temperature probe itself as it moves down (and possible up) the esophagus (Step S33). Reconstruction may then be performed to generate the 3D model of the esophagus based on the determined centerline (Step S34).

Figure 7:
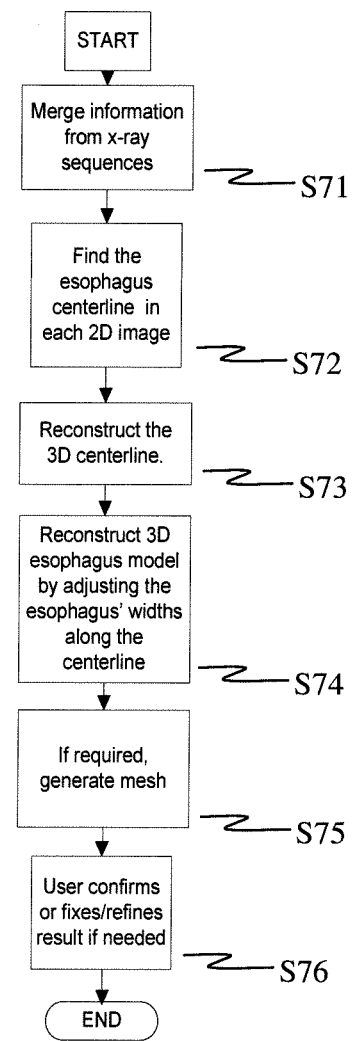
FIG. 7 is a flow chart showing workflow details pertaining to a method for performing centerline-based esophagus reconstruction according to an exemplary embodiment of the present invention.

FIG. 7 is a flow chart showing a method for performing centerline-based esophagus reconstruction according to an exemplary embodiment of the present invention. First, information from the multiple 2D X-ray sequences may be merged to generate a 3D view (Step S71). Then, two esophagus centerlines may be found within each of the 2D images (Step S72). The 3D centerline may be reconstructed, for example, by triangulation over the multiple 2D X-ray views (Step S73). A 3D model of the esophagus may be reconstructed by adjusting a width of the esophagus model along the centerline (Step S74). A polygon surface mesh may then be generated to represent the 3D model of the esophagus based on the width surrounding the centerline (Step S75). In determining the width of the esophagus, prior knowledge that may be, for example, obtained using additional images such as a CT scan, an MR data set, or even an ultrasound/ICE image may be called upon.

After reconstruction, a resulting image may be generated and displayed to provide the 3D model overlaying a 2D fluoroscopy image (Step S35). The 2D fluoroscopy image may be acquired using one of the multiple X-ray imagers used in the previous acquisition of Step S32. Additionally, or alternatively, the 3D model may be overlaid with a 3D scene that has been registered to the fluoroscopy projections. The 3-D scene may be acquired using the multiple X-ray imagers or a three-dimensional imager such as a CT scanner or MRI.

In practice, user input may be used to accept the accuracy of the model and at this step the user may be provided with an opportunity to fix or refine the results if need be (Steps S36 and S76). This opportunity for user input may allow the user to influence and accept responsibility for the determination of the position of the esophagus as fully automatic methods may be seen as less desirable by some users.

One exemplary workflow for providing semi-automation of 3D esophagus reconstruction may include: (1) reconstructing an initial 3D cylinder model around the centerline. The 3D cylinder model may offer control points to both adjust position and shape of the object. (2) The cylinder may be drawn to a registered 3D data set such that a user sees both position and initial width of the esophagus with respect to the prior data set. The width of the initial cylinder around the centerline may be sufficiently large to ensure a proper safety margin. It may be left to the user to adjust the width to make it fit her/his needs using the control points offered by the model. (3) By scrolling through the slices and using the model's control points, the user may be able to adjust the shape and width of the esophagus. The user may exercise care when selecting esophagus position as the esophagus' location may have shifted from where it was when the 3D scan was taken to where it is on the day of catheter ablation therapy. In fact, the centerline may be locked with respect to the 2D fluoroscopy images to prevent the user from causing misregistration.

Once a 3D representation of the esophagus has been achieved, safety margins may be added. As described above, safety margins may account for factors such as the wall thickness of the esophagus and/or its motion. If the esophagus' walls were well visualized in additional 3D images such as may have been acquired using a CT scanner or an MRI then there may be less need to add safety margins to account for wall size. The possibility of motion may still be taken into account.

Figure 8:
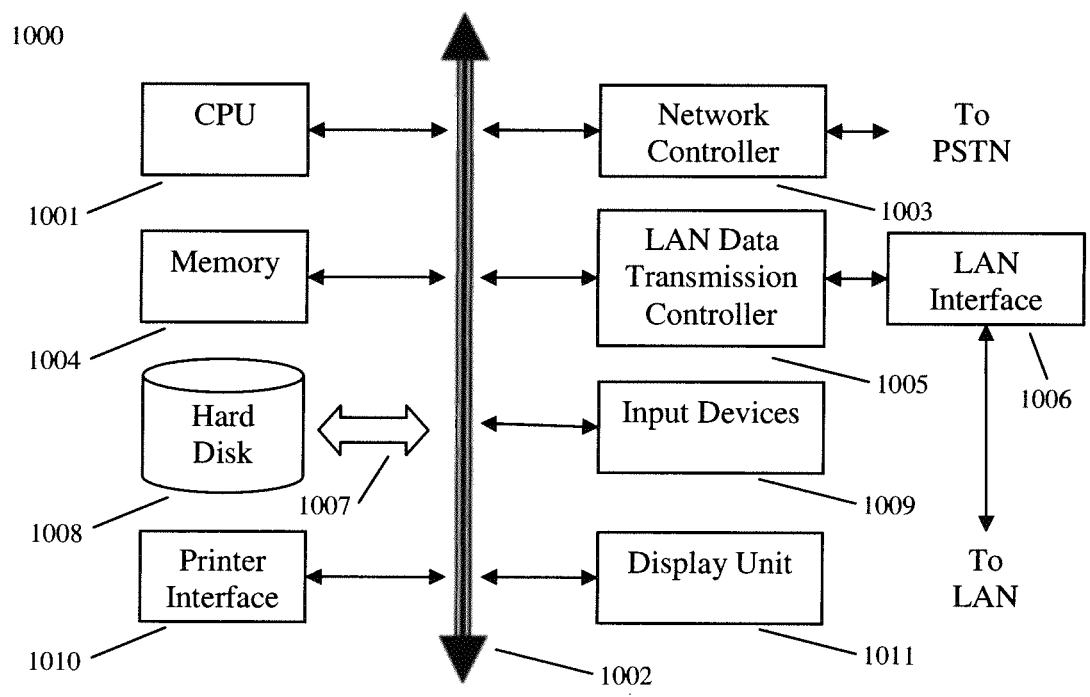
FIG. 8 shows an example of a computer system capable of implementing the method and apparatus according to embodiments of the present disclosure.

FIG. 8 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU)

1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for three-dimensional esophageal reconstruction, comprising:
    orally administering a radiocontrast agent;
    acquiring a first X-ray image from a first angle with respect to a subject using a first X-ray imager while the orally administered radiocontrast agent coats an inner lining of the esophagus;
    acquiring at least a second X-ray image from a second angle, different than the first angle, with respect to the subject using a second X-ray imager while the orally administered radiocontrast agent coats the inner lining of the esophagus;
    generating a three-dimensional model of the esophagus from the at least two X-ray images acquired at different angles;
    acquiring a set of fluoroscopic X-ray images using either the first X-ray imager or the second X-ray imager after the orally administered radiocontrast agent has substantially cleared from the esophagus;
    registering the three-dimensional model of the esophagus to the acquired set of fluoroscopic X-ray images; and
    displaying the three-dimensional model of the esophagus overlaying the set of fluoroscopic X-ray images.

2. The method of claim 1, wherein generating the three-dimensional model of the esophagus from at least two X-ray images taken under different viewing angles, comprises:
    finding at least two esophagus outline curves from each of the first and second X-ray images; and
    reconstructing a three-dimensional representation of the esophagus based on the at least four found esophagus outline curves.

3. The method of claim 2, wherein generating the three-dimensional model of the esophagus from the at least two X-ray images taken under different viewing angles further includes generating a polygon surface mesh to express the reconstruction of the three-dimensional representation of the esophagus.

4. The method of claim 2, wherein a user manually identifies the at least two esophagus outline curves from each of the first and second X-ray images.

5. The method of claim 1, wherein prior to displaying the three-dimensional model of the esophagus overlaying the set of fluoroscopic X-ray images, a user is presented with an opportunity to confirm, correct or refine the generated three-dimensional model of the esophagus of the registration of the three-dimensional model of the esophagus to the set of fluoroscopic X-ray images.

6. The method of claim 1, wherein the first X-ray imager is mounted on a first C-arm and the second X-ray imager is mounted on a second C-arm.

7. The method of claim 1, wherein the acquired first X-ray image is derived from a first fluoroscopic set of image frames and the acquired second X-ray image is derived from a second fluoroscopic set of image frames.

8. The method of claim 7, wherein the two fluoroscopic sets of image frames span a period of time in which the radiocontrast agent is orally administered to the subject.

9. The method of claim 7, wherein the first fluoroscopic set of image frames is combined to form the first X-ray image by combining maximum per-pixel values with respect to time and the second fluoroscopic set of image frames is combined to form the second X-ray image by combining maximum per-pixel values with respect to time.

10. The method of claim 7, wherein the first fluoroscopic set of image frames is combined to form the first X-ray image by combining average per-pixel values with respect to time and the second fluoroscopic set of image frames is combined to form the second X-ray image by combining average per-pixel values with respect to time.

11. The method of claim 1, wherein a device is inserted into the esophagus of the subject prior to the acquisition of the first X-ray image and the second X-ray image and the three-dimensional model of the esophagus is generated from at least two X-ray images of the device inside the esophagus taken from different viewing angles.

12. The method of claim 11, wherein generating the three-dimensional model of the esophagus from at least two X-ray images taken under different viewing angles, comprises:
    finding a centerline of the esophagus in each of the X-ray images based on the location of the device inside of the esophagus; estimating a shape of the esophagus; and
    reconstructing a three-dimensional representation of the esophagus by drawing the estimated shape of the esophagus about the found centerline.

13. The method of claim 12, wherein a predetermined esophagus shape is used as the estimate of the shape of the esophagus.

14. The method of claim 12, wherein the shape of the esophagus is estimated based on an image volume acquired from a CT scanner or MRI.

15. The method of claim 12, wherein the shape of the esophagus is estimated by using Hermite curves to connect a plurality of points sampled from the first and second X-ray images.

16. A method for three-dimensional esophageal reconstruction, comprising:
    acquiring a first X-ray image from a first angle with respect to a subject using a first X-ray imager;
    acquiring at least a second X-ray image from a second angle, different than the first angle, with respect to the subject using a second X-ray imager;
    generating a three-dimensional model of the esophagus from the at least two X-ray images acquired at different angles;
    acquiring a set of fluoroscopic X-ray images using either the first X-ray imager or the second X-ray imager;
    registering the three-dimensional model of the esophagus to the acquired set of fluoroscopic X-ray images; and
    displaying the three-dimensional model of the esophagus overlaying the set of fluoroscopic X-ray images.
    wherein the subject is orally administered a radiocontrast agent prior to the acquisition of the first X-ray image and the second X-ray image and the three-dimensional model of the esophagus is generated from at least two images taken under different viewing angles of the radiocontrast as it coats the interior lining of the esophagus, and
    wherein generating the three-dimensional model of the esophagus from at least two X-ray images taken under different viewing angles includes generating a preliminary model of the esophagus based on the detected radiocontrast and then enlarging the preliminary model of the esophagus by a safety margin to allow for esophageal wall thickness or esophageal motion.

17. The method of claim 16, wherein the esophageal wall thickness is determined based on an image volume acquired from a CT scanner or MRI.

18. A method for three-dimensional esophageal reconstruction, comprising:
orally administering a radiocontrast agent to a subject;
acquiring a first X-ray image from a first angle with respect to a subject using a first X-ray imager;
acquiring at least a second X-ray image from a second angle, different than the first angle, with respect to the subject using a second X-ray imager;
finding at least two esophagus outline curves from each of the first and second X-ray images;
reconstructing a three-dimensional model of the esophagus based on the at least four found esophagus outline curves;
acquiring a set of fluoroscopic X-ray images using either the first X-ray imager or the second X-ray imager;
registering the three-dimensional model of the esophagus to the acquired set of fluoroscopic X-ray images; and
displaying the three-dimensional model of the esophagus overlaying the set of fluoroscopic X-ray images,
wherein reconstructing the three-dimensional model of the esophagus based on the at least four found esophagus outline curves includes generating a preliminary model of the esophagus based on the at least four found esophagus outline curves and then enlarging the preliminary model of the esophagus by a safety margin to allow for esophageal wall thickness or esophageal motion.

19. A method for three-dimensional esophageal reconstruction, comprising:
inserting a device into the esophagus of a patient;
acquiring a first X-ray image from a first angle with respect to a subject using a first X-ray imager;
acquiring a second X-ray image from a second angle, different than the first angle, with respect to the subject using a second X-ray imager;
finding a 2D centerline of the esophagus in each of the first and second X-ray images based on the location of the device inside of the esophagus;
finding a 3D centerline of the esophagus based on the 2D centerlines from the first and second X-ray images;
estimating a shape of the esophagus;
reconstructing a three-dimensional model of the esophagus by drawing the estimated shape of the esophagus about the found 3D centerline;
acquiring a set of fluoroscopic X-ray images using either the first X-ray imager or the second X-ray imager;
registering the three-dimensional model of the esophagus to the acquired set of fluoroscopic X-ray images; and
displaying the three-dimensional model of the esophagus overlaying the set of fluoroscopic X-ray images,
wherein reconstructing a three-dimensional model of the esophagus by drawing the estimated shape of the esophagus about the found 3D centerline includes generating a preliminary model of the esophagus by drawing the estimated shape of the esophagus about the found 3D centerline and then enlarging the preliminary model of the esophagus by a safety margin to allow for esophageal wall thickness or esophageal motion.

20. The method of claim 19, wherein X-ray imager parameters are also used in reconstructing the 3D centerline from both 2D centerlines.

* * * * *